(12) United States Patent
Benisty et al.

(10) Patent No.: US 10,459,634 B2
(45) Date of Patent: Oct. 29, 2019

(54) METHODS, SYSTEMS, AND COMPUTER READABLE MEDIA FOR AGGREGATING COMPLETION ENTRIES IN A NONVOLATILE STORAGE DEVICE

(71) Applicant: SanDisk Technologies LLC, Plano, TX (US)

(72) Inventors: Shay Benisty, Beer Sheva (IL); Tal Sharifie, Lehavim (IL)

(73) Assignee: SANDISK TECHNOLOGIES LLC, Plano, TX (US)

( * ) Notice: Subject to any disclaimer, the term of this patent is extended or adjusted under 35 U.S.C. 154(b) by 255 days.

(21) Appl. No.: 14/929,317

(22) Filed: Oct. 31, 2015

(65) Prior Publication Data
US 2017/0123656 A1 May 4, 2017

(51) Int. Cl.
*G06F 3/06* (2006.01)
*G06F 13/42* (2006.01)
*G06F 12/02* (2006.01)

(52) U.S. Cl.
CPC ............ *G06F 3/061* (2013.01); *G06F 3/0659* (2013.01); *G06F 3/0688* (2013.01); *G06F 13/4282* (2013.01); *G06F 12/0246* (2013.01)

(58) Field of Classification Search
CPC . G06F 3/06; G06F 13/42; G06F 12/08; G06F 3/061; G06F 3/0688; G06F 12/0246; G06F 3/0659; G06F 13/4282
See application file for complete search history.

(56) References Cited

U.S. PATENT DOCUMENTS

| 2005/0108446 | A1* | 5/2005 | Inogai | G06F 13/28 710/20 |
| 2008/0300992 | A1* | 12/2008 | Wang | G06F 13/385 705/16 |
| 2016/0132237 | A1* | 5/2016 | Jeong | G06F 3/061 711/103 |

OTHER PUBLICATIONS

NVM Express, Revision 1.2, Nov. 3, 2014.*

* cited by examiner

*Primary Examiner* — David Yi
*Assistant Examiner* — Zubair Ahmed
(74) *Attorney, Agent, or Firm* — Loza & Loza, LLP; Gabriel Fitch (57) ABSTRACT

Methods, systems, and computer readable media for aggregating completion entries in a nonvolatile storage device are disclosed. On method is implemented in a data storage device including a controller and a memory. The method includes receiving a request to post a completion entry that indicates an execution of a command by a data storage device and determining whether the completion entry is to be aggregated with one or more completion entries prior to being sent by the data storage device to a host device memory. The method further includes, in response to determining that the completion entry is to be aggregated, aggregating the completion entry with at least one other completion entry within an aggregation data store per predefined aggregation criteria and sending an aggregation of the completion entry and the at least one other completion entry to the host memory device in response to a trigger event.

23 Claims, 6 Drawing Sheets

METHODS, SYSTEMS, AND COMPUTER READABLE MEDIA FOR AGGREGATING COMPLETION ENTRIES IN A NONVOLATILE STORAGE DEVICE

TECHNICAL FIELD

The subject matter described herein relates to storage devices, such as nonvolatile memory devices. More particularly, the subject matter described herein relates to conducting completion entry aggregation by a nonvolatile storage device.

BACKGROUND

In the nonvolatile memory express (NVMe) system, a host device writes data storage device commands, such as read commands, write commands, and administrative commands, in submission queues that are implemented in host memory. The nonvolatile storage device fetches the commands from the submission queues, executes the commands, and posts entries in completion queues, which are also implemented in host memory, to notify the host device of the completion of the commands. The NVMe standard, the current version of which is NVM Express, Revision 1.2, Nov. 3, 2014, the disclosure of which is incorporated herein by reference in its entirety, describes that the nonvolatile storage device posts a completion entry to an appropriate completion queue in the host device via a communication that is typically smaller than the cache line size of the host device memory. Further, each completion entry is posted in the completion queue via a partial cache line write that compels the host device to perform a read-modify-write operation. Notably, such a read-modify-write operation is inefficient as compared to a single write operation than can be used to perform a full cache line write. In addition, the practice of communicating single (i.e., small in data size) write requests to the host device from the data storage device via a connecting peripheral component interconnect express (PCIe) bus is considerably inefficient.

Accordingly, there exists a need for methods, systems, and computer readable media for aggregating completion entries in a nonvolatile storage device.

SUMMARY

Methods, systems, and computer readable media for aggregating completion entries in a nonvolatile storage device are disclosed. One method is implemented in a data storage device including a controller and a memory. The method includes receiving a request to post a completion entry that indicates an execution of a command by a data storage device and determining, based on predefined aggregation criteria, whether the completion entry is to be aggregated with one or more completion entries prior to being sent by the data storage device to a host device memory. The method further includes, in response to determining that the completion entry is to be aggregated, aggregating the completion entry with at least one other completion entry within an aggregation data store per the predefined aggregation criteria and sending an aggregation of the completion entry and the at least one other completion entry from the aggregation data store to the host memory device in response to a trigger event.

The subject matter described herein may be implemented in hardware, software, firmware, or any combination thereof. As such, the terms "function" "node" or "module" as used herein refer to hardware, which may also include software and/or firmware components, for implementing the feature being described. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

As stated above, according to the NVMe standard, a host device communicates memory device commands, such as read commands, write commands, and administrative ("admin") commands, to a nonvolatile storage device using submission queues. The non-volatile storage device further executes the commands and subsequently places and/or posts corresponding entries in completion queues, which are also implemented in host memory, to notify the host device of completion of the commands. Notably, the disclosed subject matter enables a memory device controller to group and/or aggregate a plurality of completion entries that are associated with a common completion queue (CQ) before the entries are flushed (e.g., individually) to a host device. Since the completion queues are physically located in the host device memory, the disclosed subject matter affords the technical advantage of communicating an aggregation of completion entries to the host device memory via a full cache line write instead of a partial line write operation (which is used to post a single completion entry). Further, for each partial cache line write operation performed, a host device may be compelled to perform a read-modify-write operation as opposed to executing a more efficient single write operation associated with a full cache line write. Notably, the data transfer on a PCIe bus existing between a host device and its associated nonvolatile memory device can be improved when aggregating several small write requests into a single larger write request. Ultimately, the disclosed subject matter provides an efficient method for processing completion entries of NVMe commands that are executed on the non-volatile storage device such that system performance and use of system resources is optimized.

Figure 1:
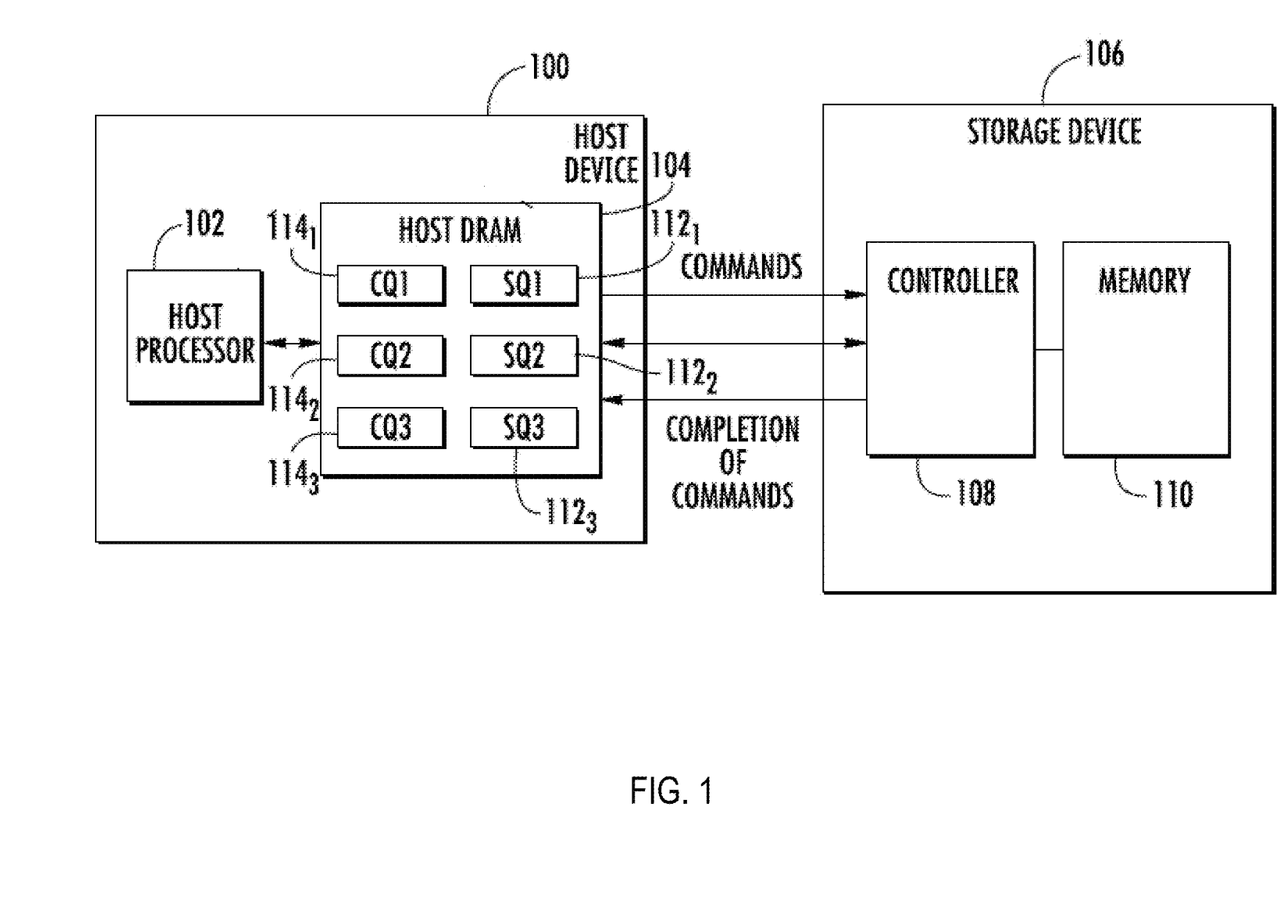
FIG. 1 is a block diagram illustrating a host device and a nonvolatile storage device according to the NVMe architecture.

FIG. 1 illustrates the NVMe architecture in which the subject matter described herein for which completion entry aggregation may be implemented. In FIG. 1, host device 100 may be any suitable computing platform that is capable of accessing memory on a storage device. For example, host device 100 may be a desktop personal computer, a laptop computer, a tablet computer, a mobile telephone, or a front end to a storage array. Host device 100 includes a processor 102 and memory 104, which in the illustrated example is DRAM. Host device 100 may store data in nonvolatile storage device 106. Nonvolatile storage device 106 may be any suitable device that provides nonvolatile memory storage for host device 100. Nonvolatile storage device 106 may be a removable storage device, such as a solid state drive (SSD) that is removably connectable to host device 100. In an alternate example, nonvolatile storage device 106 may be non-removable or integrated within host device 100. In some embodiments, host device 100 and nonvolatile storage device 106 are communicatively connected via a PCIe bus.

Nonvolatile storage device 106 includes a device controller 108 and nonvolatile memory 110. Device controller 108 controls access to nonvolatile memory 110. In one embodiment, device controller 108 may be a nonvolatile memory controller that implements or supports the NVMe protocol, and nonvolatile memory 110 may be 2D or 3D NAND flash memory.

In order for host device 100 to read data from or write data to nonvolatile storage device 106, host processor 102 creates and writes commands in submission queues $112_1$, $112_2$, and $112_3$. Three submission queues are shown for illustrative purposes. It is understood that there may be more or fewer than three submission queues at any given time depending on NVMe device usage by the host system. Device controller 108 fetches the commands from submission queues $112_1$, $112_2$, and $112_3$ and executes the commands. Upon completion of the commands, device controller 108 writes completion entries that are ultimately directed to completion queues $114_1$, $114_2$, and $114_3$. In some examples, each of completion queues $114_1$, $114_2$, and $114_3$ is a circular buffer memory with a fixed 16 byte slot size that is configured to post completion entries (e.g., entries that indicate status of completed commands). In some embodiments, during an initialization phase, host device 100 may create a plurality of submission queues (e.g., submission queues $112_1$, $112_2$, and $112_3$) and corresponding plurality of completion queues (e.g., completion queues $114_1$, $114_2$, and $114_3$). Host device 100 may further generate and hold a sequential queue-completion queue mapping table (not shown) that records the associations/mappings via the use of sequential queue identifiers and completion queue identifiers.

Figure 2:
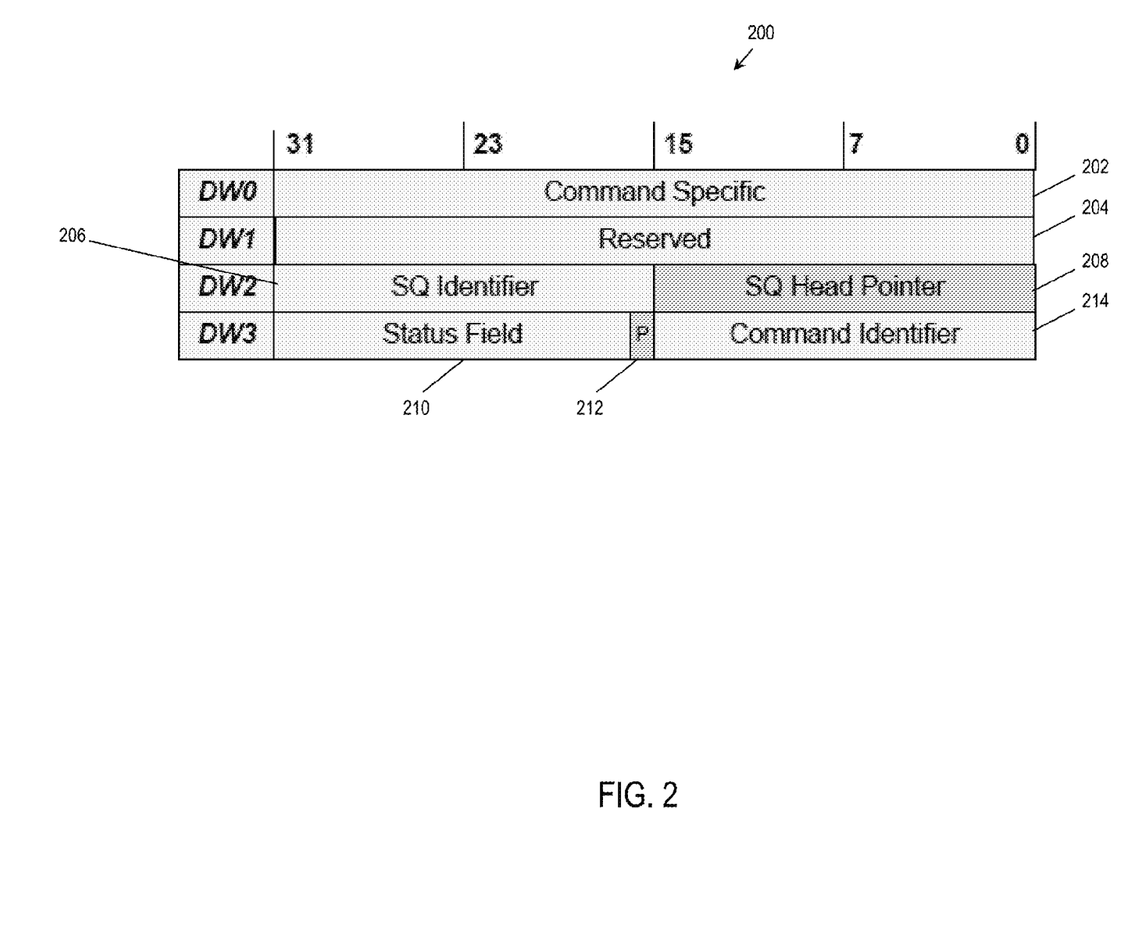
FIG. 2 is a block diagram illustrating an example structure of a completion entry for a completed NVME command.

FIG. 2 depicts an example structure of a completion entry 200 for a particular command that is completed on a nonvolatile storage device (e.g., nonvolatile storage device 106 in FIG. 1) in accordance to an embodiment of the subject matter described herein. In general, completion entry 200 contains data that is required for writing a completed command to a designated completion queue (CQ) on the host device. As shown in FIG. 2, completion entry 200 includes a plurality of different data fields including a command specific field 202, a reserved field 204, a submission queue (SQ) identifier field 206, a SQ head pointer field 208, a status field 210, a 'P' field 212, and a command identifier field 214. Notably, each of these fields is configured to contain various data values based on the type of command associated with completion entry 200. For example, for non-admin commands, a command specific field 202 and a Status field 210 of completion entry 200 would be cleared to a zero value (unless in an error scenario exists). More specifically, command specific field 202 will contain zeroes if the associated command is an operational I/O command, such as a read command or a write command. In contrast, if the command is an admin command (or an error), command specific field 202 will contain non-zero information as required by the admin command (or additional information indicative of the error).

Accordingly, for most NVMe I/O commands, such as normal read and write commands, only a submission queue (SQ) identifier field 206, a SQ head pointer field 208, the 'P' field 212, and a command identifier field 214 of an associated completion entry 200 contain valid information. Notably, the other remaining fields are cleared to 0. In some instances, SQ identifier field 206 includes data that enables an association to be made between completion entry 200 and an originating submission queue identifier. Further, status field 210 indicates the status of the command that is being completed and/or executed in storage device 106. In some examples, the size of each completion entry is fixed to 16 bytes per the NVMe standard.

Figure 3:
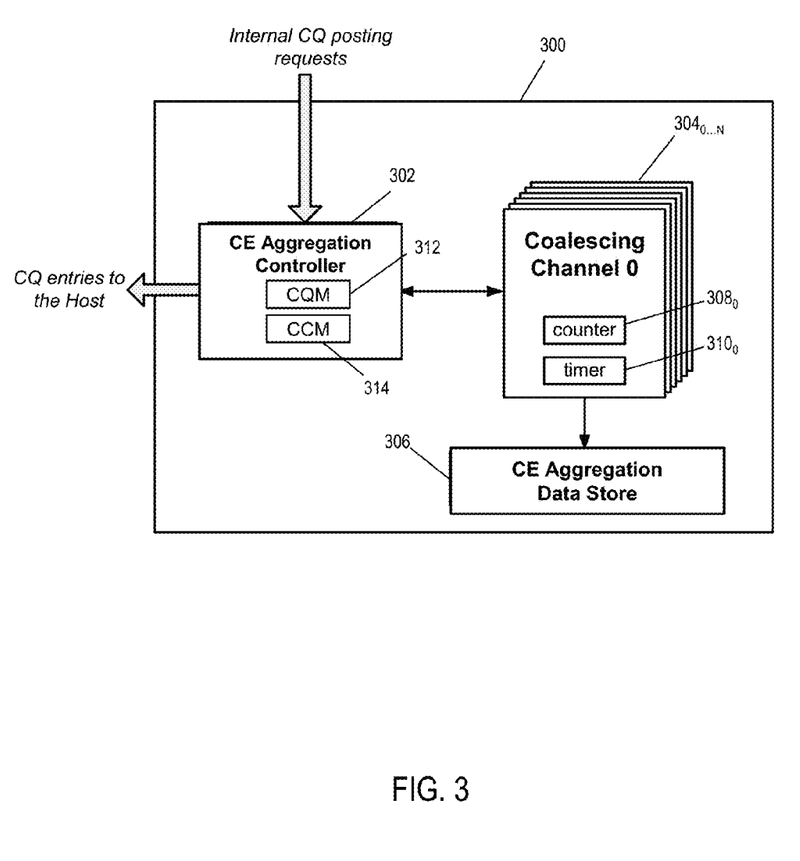
FIG. 3 is a block diagram illustrating a completion entry aggregator according to an embodiment of the subject matter described herein.

FIG. 3 is a block diagram illustrating a completion entry aggregator 300 according to an embodiment of the subject matter described herein. FIG. 3 depicts a completion entry (CE) aggregator 300 that includes a CE aggregation controller 302, a plurality of coalescing channels $304_{0...N}$, and a CE aggregation data store 306. CE aggregation controller 302 may include a completion queue manager (CQM) 312 and a coalescing channel manager (CCM) 314. In some examples, each of CE aggregator 300, completion queue manager 312, and coalescing channel manager 314 may be embodied as a module, application, or other logic stored in memory 110 and executed by device controller 108 shown in FIG. 1.

In some embodiments, CE aggregation controller 302 (and/or completion queue manager 312) is configured to receive a completion entry posting request internally within storage device 106. In response to the received completion entry posting request, completion queue manager 312 in CE aggregation controller 302 may be configured to process an associated completion entry based on an underlying CE aggregation algorithm (e.g., see algorithm illustrated in FIGS. 4A and 4B). In some embodiments, CE aggregation controller 302 may be configured to execute the aggregation algorithm (in response to receiving a completion entry request), which in turn enables controller 302 to perform at least one operation that includes: i) an aggregation operation, ii) a coalescing channel allocation and subsequent completion entry aggregation operation, iii) a new completion entry flushing operation, or iv) a partial completion entry flushing operation and new completion entry flushing operation.

In some examples, the completion entries are selected for aggregation by aggregation controller 302 (and/or completion queue manager 312) based on at least one of: i) the type of data included in the completion entry (e.g., specific values contained in specific fields of the completion entry), ii) data transfer size (e.g., size of the completion entry), iii) the type of completion queue (e.g., administrative queue or I/O queue). In addition, a completion entry may be selected for aggregation by aggregation controller 302 (and/or completion queue manager 312) in a manner that complies with the cache line size of the host device. The manner in which aggregation controller 302 (and/or completion queue manager 312) utilizes this aggregation criteria is disclosed in detail below.

In some examples, CE aggregator controller 302 is configured to identify and manage the completion entries that constitute the optimal candidates for completion entry aggregation and subsequent communication to the host device memory. After the device controller completes the execution of a command and prior to the flushing of the associated completion entry to a completion queue on the host device, completion queue manager 312 makes a determination to either i) aggregate the selected completion entry with other completion entries on the device controller or ii) immediately flush the completion entry to the completion queue on the host device. After making such a determination, completion queue manager 312 (along with coalescing channel manager 314) is configured to manage the aggregation of the completion entries before flushing the aggregation to the completion queue on the host device.

In some embodiments, aggregation controller 302 and/or completion queue manager 312 may be configured to establish and utilize a set of predefined aggregation criteria to determine when to aggregate a completion entry with one or more other completion entries or when to immediately flush a completion entry to the completion queue on host device 100. Exemplary aggregation criteria considered by aggregation controller 302 and/or completion queue manager 312 may include whether or not a coalescing channel for a completion queue associated with aggregated completion entries currently exists. Other aggregation criteria considered by aggregation controller 302 and/or completion queue manager 312 may be based on the value of the CQ identifier included in the received completion entry posting request.

If the CQ identifier is not equal to zero, then the corresponding completion queue in the host device will be determined to be an I/O queue that is configured to contain operational commands, such as read and write. For all such operational commands, aggregation controller 302 is configured to aggregate completion entries and subsequently flush them to the completion queue via a coalescing channel 304 when required (e.g., using counter 308 and/or timer 310). However, if the CQ identifier in the completion entry posting request is equal to zero, the associated completion queue is identified as a designated admin queue, which is configured to contain admin commands, such as an identify command, a get features command, and a set features command. Accordingly, aggregation controller 302 and/or completion queue manager 312 may be configured to flush the completion entries of the executed commands to the completion queue on the host device as soon as possible.

Further aggregation criteria utilized by aggregation controller 302 includes information that pertains to the size of the data transfer. For example, aggregation controller 302 may be configured to detect when the data transfer size of the command is equal to 4 kilobytes (which typically represents a random access of the media). In such a scenario, aggregation controller 302 may be configured to flush the new completion entry to the completion queue as soon as possible (e.g., since reduction of latency is extremely important in this scenario). If the data transfer size of the command is determined to not be equal to 4 KB, the completion entry may be selected for aggregation (e.g., since reduction of latency is less important in this scenario).

Other aggregation criteria utilized by aggregation controller 302 is based on data included in the completion entry itself. For example, if the completion entry does not contain any excess information, this serves as an indication that each of command specific field 202 and status field 210 of that completion entry must be cleared. Specifically, each of fields 202 and 210 should contain a zero value unless an error scenario or an admin operation is involved. In such scenarios (e.g., involvement of an error or admin command), aggregation controller 302 and/or completion queue manager 312 is configured to flush the completion entry immediately to host device 100.

Other aggregation criteria utilized by aggregation controller 302 is one based on the host cache line size. Specifically, the current completion entry to be aggregated should start a new cache line in host memory 104. As part of an initialization phase, host device 100 may be configured to provide controller device 108 with data regarding the size of the host cache line. Using this information, controller device 108 may be configured to optimize aggregation controller 302. Further, a full cache line may be written to the completion queue in the future after aggregating a plurality of completion entries.

Another aggregation criteria utilized by controller 302 is one based on a maximum packet size. For example, during the initialization phase, host device 100 may designate a PCIe parameter called Max Packet Size. Notably, host device 100 assigns the value of the parameter, which defines the maximum size of a PCIe packet. In some embodiments, all PCIe packets are configured to be the Max Packet Size (since it is inefficient to use smaller sized packets). Notably, the maximum PCIe packet size may be use as a threshold for a trigger event (alone or in combination with the host cache line size threshold). For example, in some embodiments, the maximum number of aggregated completion entries for each completion queue can be based on two parameters: the host cache line size and the PCIe maximum packet size. Notably, the maximum number of aggregated completion entries should be equal to the smaller of these two parameters. For example, suppose the cache line size is equal to 4 completion entries (e.g., 64 Bytes) and the PCIe Max Packet size is equal to 2 completion entries (e.g., 32 Bytes). In this example, since the aggregated completion entries are posted through the PCIe bus, there is no reason to aggregate more than 2 entries (i.e., since it is not permitted to have a packet size of more than 32 Bytes).

In some embodiments, aggregation controller 302 and/or coalescing channel manager 314 may manage the completion entry aggregation process for each coalescing channel 304 by utilizing a counter 308 and/or a timer 310. As used herein, a coalescing channel is a channel of communication established by aggregation controller (and/or coalescing channel manager 314) to communicate aggregated completion entries from nonvolatile storage device 106 to a completion entry in host device 100. In some embodiments, coalescing channel manager 314 may be configured to assign or allocate a coalescing channel on a per completion queue basis. That is, each coalescing channel is only associated with a single completion queue in host device 100.

Further, each coalescing channel 304 may be configured to initiate a counter 308 to record and keep track of the size of the aggregated completion entries that are allocated to the coalescing channel. In the event the cumulative data size of the aggregated completion entries matches a predefined data size threshold (e.g., a cache line size of host device), aggregation controller 302 and/or coalescing channel manager 314 may be configured to issue a flush request (i.e., a request to send, transfer, and/or communicate the completion entry or entries to host device 100) to the coalescing channel in response to this trigger event. Similarly, coalescing channel 304 may initiate a timer 310 (e.g., utilizing an internal clock) upon designating a first completion entry for aggregation. Upon the expiration of a predefined amount of time as recorded by timer 310, coalescing channel manager 314 may be configured to issue a flush request to the associated coalescing channel as a response to this trigger event. Aggregation controller 302 may also manage the completion entry aggregation process by identifying opened coalescing channels, allocating new coalescing channels, partial flushing of existing completion entries that are associated with the submission queue (SQ) identifier of the new posting request, and the like. In some examples, a coalescing channel may be opened and allocated for a completion entry that is selected for aggregation in the event there is no currently opened coalescing channel.

In some embodiments, aggregation controller 302 and/or coalescing channel manager 314 may perform at least one of two functions in the event the completion entry is selected for aggregation based on the aggregation criteria. For example, coalescing channel manager 314 may initiate an aggregation operation by sending an aggregation request to a coalescing channel 304. Upon receipt of the request, the value of a counter 308 is incremented to reflect the data size (e.g., number of bytes) of the completion entry and the relevant completion entries fields are stored in the appropriate location in the CE aggregation data store 306. In some embodiments, only the values contained in SQ identifier field 206 and command identifier field 214 need to be stored as an entry in aggregation data store 306. For example, the parameter values in each of command specific field 202, reserved field 204, and status field 210 of a completion entry to be aggregated may be cleared to zero. Further, the values included in SQ Head Pointer field 208 and P field 212 include parameter values that are global to a particular completion queue and, thus, there is no need to aggregate these values for each completion entry to be aggregated. Moreover, these two parameter values are typically stored for each particular completion queue even when aggregation is not utilized.

Coalescing channel manager 314 may also configured to initiate a flush operation in response to a trigger event. For example, coalescing channel manager 314 may initiate the flushing of aggregated completion entries in the event the data size (e.g., number of bytes, kilobytes, etc.) of the aggregated completion entries is equal to a cache line size of host device 104 (shown in FIG. 1). In some embodiments, this determination can be made by CCM 334 and/or coalescing channel 304 via the use of internal counter 308. Similarly, the flush operation may be initiated by a trigger event in which a predefined amount of time as recorded by timer 310 has expired. In some scenarios, CE aggregation controller 302 may send a flush request to a specific coalescing channel 304 (e.g., a partial flush and subsequent flush of new entry). In both cases, the completion entries which have been aggregated in the CE aggregation storage 306 are fetched and flushed to a completion queue in host device 100.

Figure 4A:
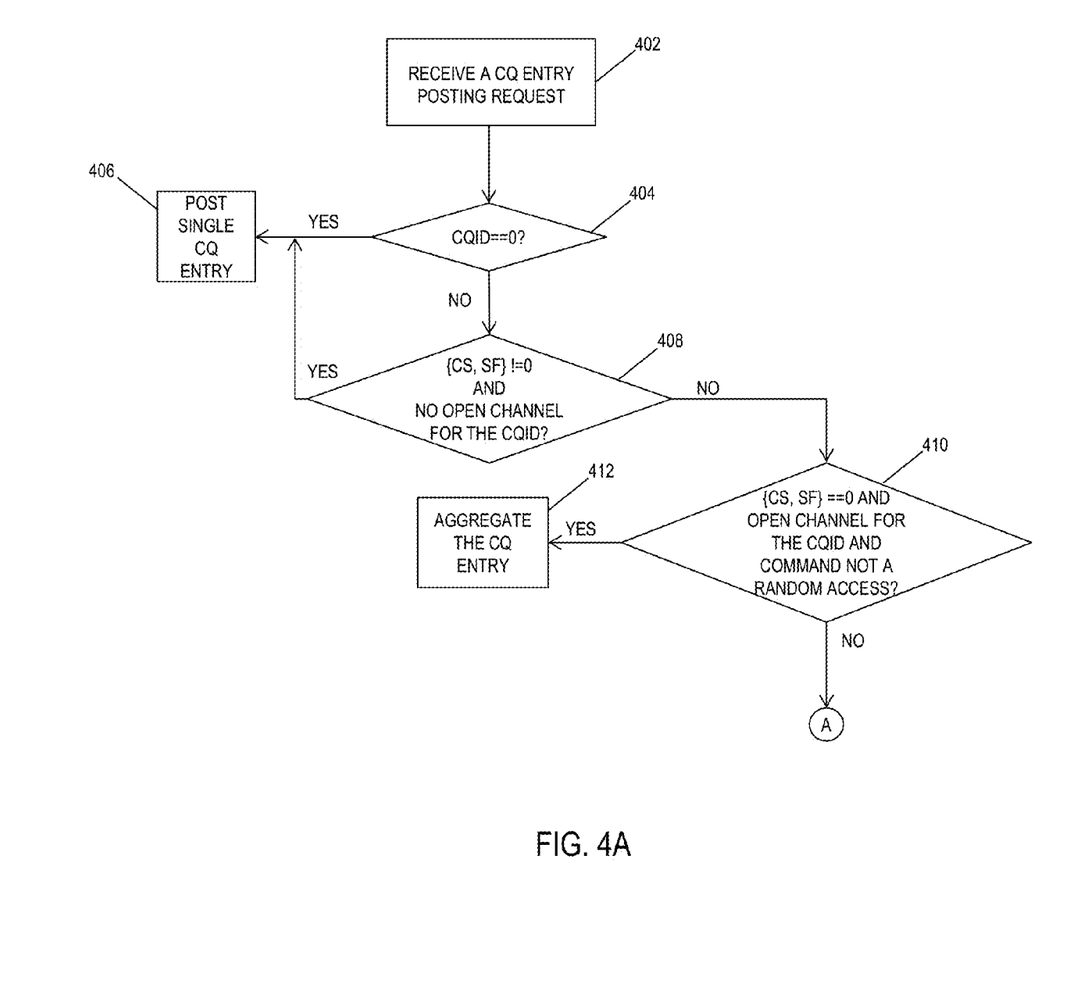
FIGS. 4A and 4B illustrate a flow diagram of an example algorithm for conducting completion aggregation according to an embodiment of the subject matter described herein.
Figure 4B:
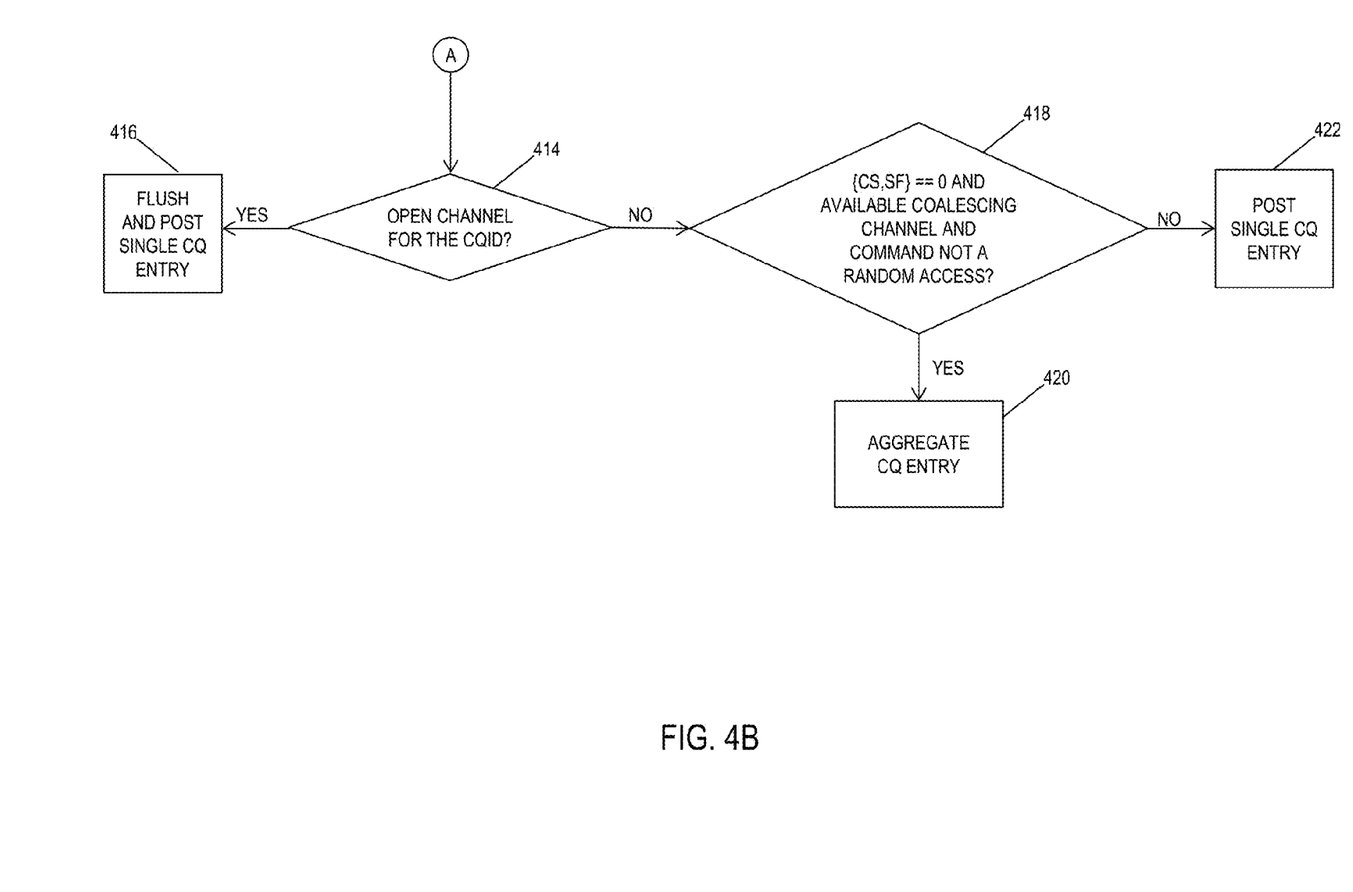

FIGS. 4A and 4B illustrate a flow diagram of an example algorithm 400 for conducting completion aggregation according to an embodiment of the subject matter described herein. In some embodiments, algorithm 400 is executed by aggregation controller 302 (shown in FIG. 3) and/or device controller 108 (shown in FIG. 1)

In block 402, a new completion entry posting request with a CQ identifier is received. In some embodiments, a CE aggregation controller receives an internal CQ posting request. For example, a storage device may include a hardware or firmware "completion entry requestor" component that is configured to detect when the data transfer of each command is completed by the storage device. Upon this detection, the completion entry requestor submits and/or posts a completion request to the aggregation controller. In some embodiments, CE aggregation controller may be configured to obtain the CQ identifier from a sequential queue-completion queue mapping table stored on the host device. In another embodiment, the aggregation controller may received the CQ identifier as input (e.g., along with the SQ identifier) from another component on the storage device that has access to the mapping table.

In block 404, the CQ identifier is determined. In some embodiments, the CE aggregator controller may inspect the CQ identifier included in the completion entry request and read the represented numeric value. If the CQ identifier is determined to be equal to zero (0), then algorithm 400 proceeds to block 406 where the completion entry associated with the received posting request is not aggregated, but instead immediately sent to the host device to be posted in the completion queue identified by the aforementioned CQ identifier. Notably, a CQ identifier equal to 0 indicates that the associated completion queue is an administrative completion queue. Otherwise, algorithm 400 continues to block 408.

In block 408, the CE aggregator controller determines i) if either the command specific field or the status field (e.g., the concatenation of the values of the command specific field and status field) in the completion entry are not equal to zero (0) and ii) if there is not a coalescing channel currently allocated (e.g., opened) for the CQ identifier. If each of the command specific field and the status field in the completion entry contain a non-zero value and there is no allocated coalescing channel for the CQ identifier indicated in the associated posting request, then algorithm 400 proceeds to block 406 where the completion entry is not aggregated and is immediately posted in the identified completion queue in the host device. Otherwise, algorithm 400 continues to block 410.

In block 410, the CE aggregator controller determines i) if both the command specific field and the status field in the completion entry are equal to zero (0), ii) if there is a coalescing channel currently allocated (e.g., opened), and iii) if the current executed command corresponding to the completion entry does not represent a random access. If each of these criteria are satisfied and/or met (i.e., are "true"), then algorithm 400 proceeds to block 412 where the completion entry is aggregated and stored in the CE aggregation data store. Otherwise, algorithm 400 continues to block 414.

In block 414, the CE aggregator controller determines if there is an open coalescing channel that is currently allocated for the CQ identifier. If such an allocated coalescing channel exists, algorithm 400 continues to block 416 where any aggregated completion entries of the coalescing channel are flushed to the host device and the current completion entry is subsequently posted to the associated completion queue in the host device. If no allocated coalescing channel exists, algorithm 400 instead proceeds to block 418.

In block 418, the CE aggregator controller determines: i) both the command specific field and the status field are equal to zero (0), ii) there is an available coalescing channel that is not assigned to a CQ identifier, iii) the current completion entry starts a new cache line the host device memory, iv) there is at least one empty cache line in the completion queue based on the head point entry and tail point entry of the completion entry, and v) the current executed command does not represent a random access. If these criteria are satisfied and/or met (i.e., true), then algorithm 400 continues to block 420 where the available coalescing channel is allocated for the CQ identifier and the completion entry is aggregated and/or stored in the CE aggregation data store. Otherwise, algorithm 400 proceeds to block 422 wherein the completion entry is not aggregated and is posted to the appropriate completion queue in the host device.

Figure 5:
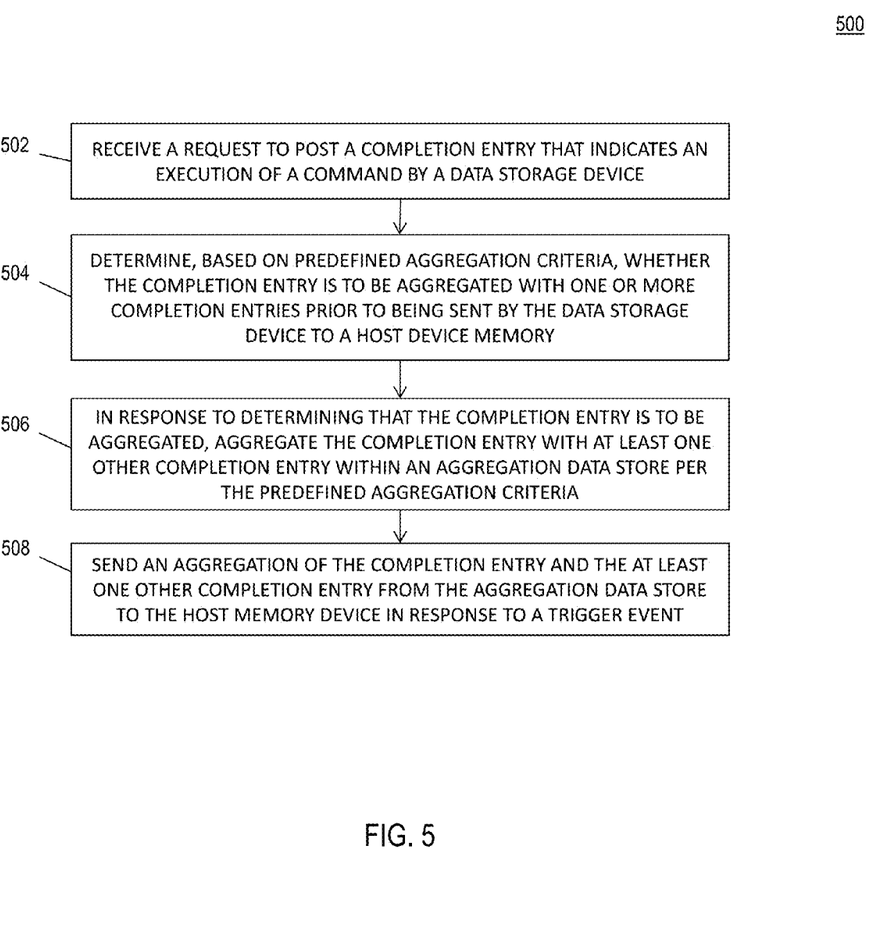
FIG. 5 is a flow chart illustrating a method for aggregating completion entries in a nonvolatile storage device according to an embodiment of the subject matter described herein.

FIG. 5 is a flow chart illustrating a method 500 for aggregating completion entries in a nonvolatile storage device according to an embodiment of the subject matter described herein. In block 502, a request to post a completion entry that indicates an execution of a command by a data storage device is received. In some examples, an aggregation controller receives a request to post a completion entry in a completion queue in a host device that is communicatively connected to the nonvolatile storage device.

In block 504, a determination is made, based on predefined aggregation criteria, as to whether the completion entry is to be aggregated with one or more completion entries prior to being sent by the data storage device to a host device memory. In some examples, the aggregation controller utilizes aggregation criteria to assess whether the completion entry associated with the received posting request is to be immediately posted to the completion queue in the host device or if the completion entry is to be aggregated with other completion entries prior to posting.

In block 506, the completion entry is aggregated with at least one other completion entry within an aggregation data store per the predefined aggregation criteria in response to determining that the completion entry is to be aggregated. In some examples, the aggregation controller aggregates the completion entry (if not the first completion entry designated for aggregation for an identified coalescing channel) to at least one other completion entry in an aggregation data store located in the nonvolatile storage device.

In block 508, an aggregation of the completion entry and the at least one other completion entry is sent from the aggregation data store to the host memory device in response to a trigger event. In some examples, an internal counter associated with a coalescing channel indicates that the size of the aggregated completion entries is equal to the cache line size of the host device. In some embodiments, the trigger event may include a determination that the aforementioned aggregation includes a number of completion entries that is equal to a maximum packet size, such as a designated PCIe Max Packet Size. In response to one or more of these trigger events, the aggregation controller may be configured to send a flush request to the coalescing channel, which fetches the completion entries stored in the aggregation data store and subsequently flushes the aggregation of completion entries to the related completion queue in the host device.

The subject matter described herein can be implemented in any suitable NAND flash memory, including 2D or 3D NAND flash memory. Semiconductor memory devices include volatile memory devices, such as dynamic random access memory ("DRAM") or static random access memory ("SRAM") devices, nonvolatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that the subject matter described herein is not limited to the two dimensional and three dimensional exemplary structures described but cover all relevant memory structures within the spirit and scope of the subject matter as described herein and as understood by one of skill in the art.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. In a data storage device including a controller and a memory, a method for aggregating completion entries, the method comprising:
   receiving a request to post a completion entry to a host device, the completion entry created in response to execution of a command by a data storage device;
   determining whether the completion entry is suitable for aggregation prior to being sent to the host device based on a field of the completion entry;
   aggregating the completion entry in response to determining that the completion entry is suitable for aggregation, wherein aggregating the completion entry comprises:
      aggregating the completion entry with at least one other completion entry within an aggregation data store per a predefined aggregation criteria prior to sending the completion entry to the host device, and
      sending an aggregation of the completion entry and the at least one other completion entry from the aggregation data store to the host device in response to a trigger event; and
   sending the completion entry to the host device without aggregating the completion entry in the aggregation data store in response to determining that the completion entry is not suitable for aggregation.

2. The method of claim 1, wherein the trigger event includes a determination that a size of the aggregation is equal to a cache line size of the host device.

3. The method of claim 1, wherein the trigger event includes a determination that a size of the aggregation is equal to a maximum PCIe packet size defined by a host device.

4. The method of claim 1, wherein the aggregation is sent to a completion queue in the host device using a full cache line write operation.

5. The method of claim 4, wherein the aggregation is sent to the completion queue via a coalescing channel that is assigned to the completion queue.

6. The method of claim 1, wherein the command executed by the data storage device includes a nonvolatile memory express (NVMe) command.

7. The method of claim 1, further comprising:
   determining that the completion entry is not suitable for aggregation in response to determining that the command comprises one of an administrative command and a random access command.

8. The method of claim 1, further comprising:
   determining that the completion entry is not suitable for aggregation in response to determining that the command corresponds to a random access to the data storage device,
   wherein transmitting the completion entry further comprises flushing the aggregation data store to the host device.

9. The method of claim 1, wherein the data storage device comprises a nonvolatile memory device and the controller comprises a nonvolatile memory controller.

10. The method of claim 9, wherein the nonvolatile memory controller comprises a nonvolatile memory express (NVMe) controller.

11. The method of claim 1, wherein the memory of the data storage device comprises two dimensional or three dimensional NAND flash memory.

12. A data storage device, comprising:
a memory;
a completion queue manager for receiving a request to post a completion entry, the completion entry indicating execution of a command by the data storage device and for evaluating the completion entry to determine whether the completion entry is a candidate for aggregation; and
a coalescing channel manager communicatively coupled to a host device memory, wherein:
in response to the completion queue manager determining that the completion entry is a candidate for aggregation, the coalescing channel manager
aggregates the completion entry with at least one other completion entry within an aggregation data store per a predefined aggregation criteria, and
sends an aggregation of the completion entry and the at least one other completion entry from the aggregation data store to the host device memory in response to a trigger event, and
in response to the completion queue manager determining that the completion entry is not a candidate for aggregation, the coalescing channel manager sends the completion entry to the host device memory without aggregating the completion entry with the at least one other completion entry in the aggregation data store,
wherein the completion queue manager and the coalescing channel manager comprise one or more of a circuity, firmware, and instructions stored on a non-transitory computer-readable storage medium.

13. The data storage device of claim 12, wherein the trigger event includes a determination by the coalescing channel manager that a size of the aggregation is equal to a cache line size of the host device memory.

14. The data storage device of claim 12, wherein the trigger event includes a determination by the coalescing channel manager that a size of the aggregation is equal to a maximum PCIe packet size.

15. The data storage device of claim 12, wherein the coalescing channel manager is further configured to send the aggregation to a completion queue in the host device memory using a full cache line write operation.

16. The data storage device of claim 15, wherein the coalescing channel manager is further configured to send the aggregation to the completion queue via a coalescing channel that is assigned to the completion queue.

17. The data storage device of claim 12, wherein the command executed by the data storage device includes a nonvolatile memory express (NVMe) command.

18. The data storage device of claim 12, wherein the completion queue manager determines that the completion entry is not a candidate for aggregation in response to determining that one or more of a command identifier field and a status field of the completion entry indicating that the command of the completion entry comprises an administrative command.

19. The data storage device of claim 12, wherein:
the completion queue manager determines that the completion entry is not a candidate for aggregation in response to determining that a data transfer size of the command corresponds to a random access, and
the coalescing channel manager flushes the aggregation data store to the host device memory device prior to sending the completion entry to the host device memory.

20. The data storage device of claim 12, wherein the memory comprises a nonvolatile memory and further comprising a nonvolatile memory controller.

21. The data storage device of claim 20, wherein the nonvolatile memory controller comprises a nonvolatile memory express (NVMe) controller.

22. The data storage device of claim 12, wherein the memory of the data storage device comprises two dimensional or three dimensional NAND flash memory.

23. A non-transitory computer readable medium having stored thereon executable instructions that when executed by a processor of a computer control the computer to perform operations, the operations comprising:
receiving a request to post a completion entry that indicates an execution of a command by a data storage device to a host memory; and
determining whether to perform aggregation processing prior to sending the completion entry to the host memory, wherein the determining is based on the command associated with the completion entry, the determining to bypass aggregation processing in response the command comprising one of an administrative command and a random access command;
wherein, response to determining to perform the aggregation processing prior to sending the completion entry to the host memory, the operations further comprise:
aggregating the completion entry with at least one other completion entry within an aggregation data store per a predefined aggregation criteria, and
sending an aggregation of the completion entry and the at least one other completion entry from the aggregation data store to the host memory in response to a trigger event, and
wherein, in response to determining to bypass the aggregation processing, the operations further comprise:
sending the completion entry to the host memory without performing aggregation processing.

* * * * *